Oct. 30, 1956  H. GINTOVT  2,769,073
POTENTIOMETER
Filed Sept. 10, 1954
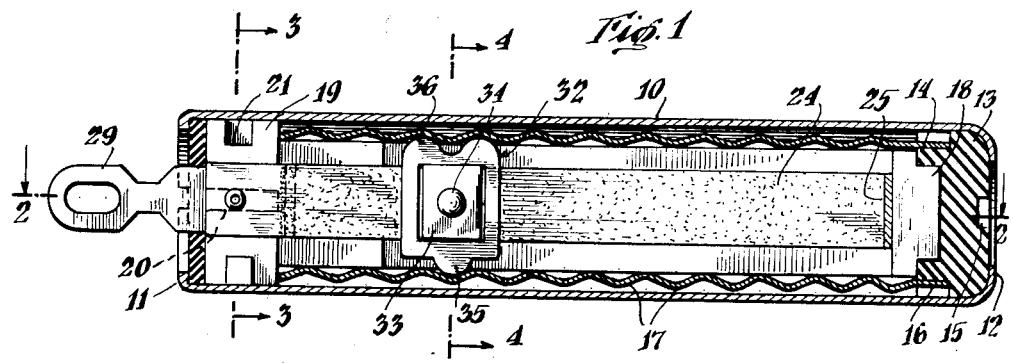
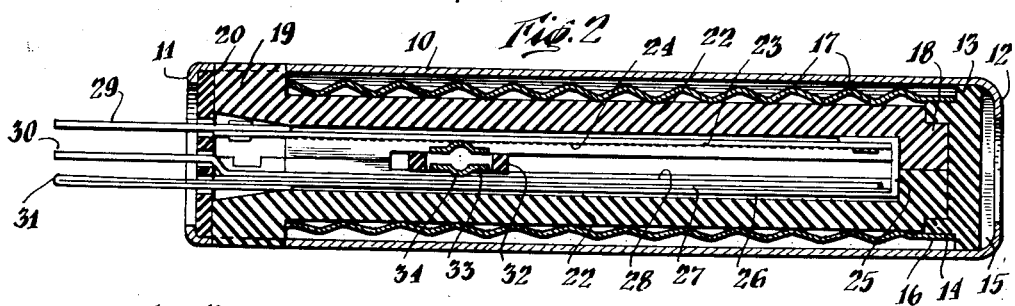
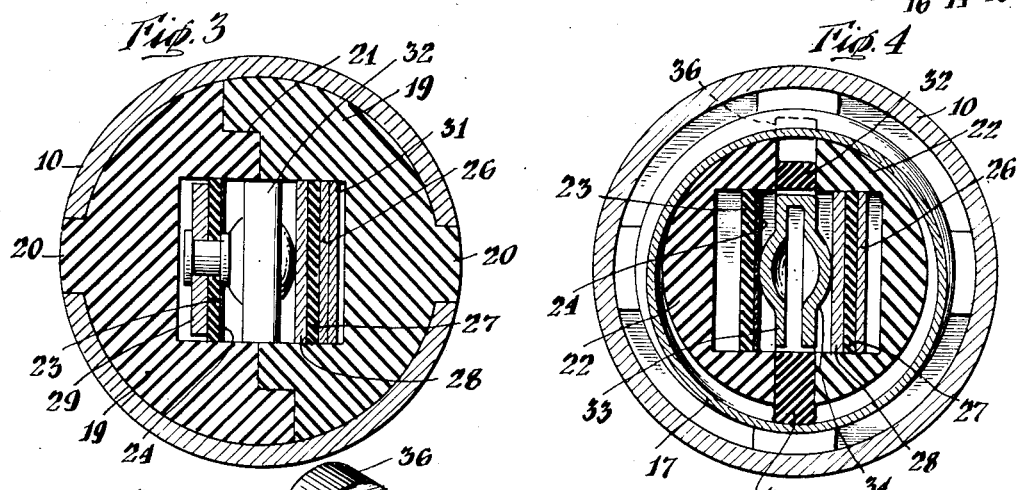
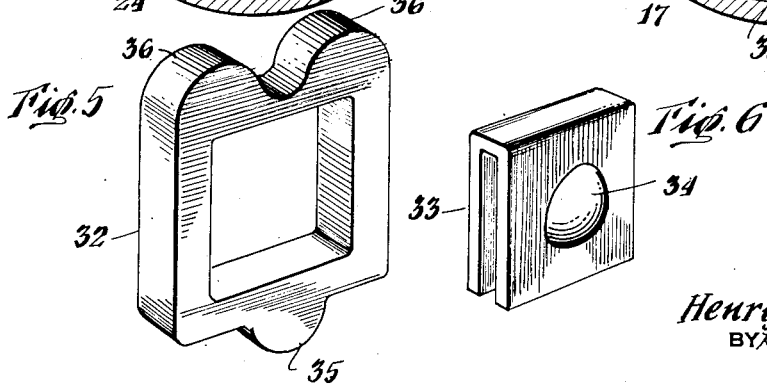
INVENTOR
Henry Gintovt
BY Kane, Dalsimer and Kane
ATTORNEYS

United States Patent Office

2,769,073
Patented Oct. 30, 1956

2,769,073
POTENTIOMETER

Henry Gintovt, Dover, N. H., assignor to Clarostat Mfg. Co., Inc., Dover, N. H., a corporation of New York Application September 10, 1954, Serial No. 455,125

12 Claims. (Cl. 201—62)

This invention relates to a structurally and functionally improved potentiometer to be used as a control in divers types of electrical circuits.

It is an object of the invention to furnish a unit of this character the parts of which may readily be adjusted to precisely control a circuit; the unit being capable of ready disposition within a relatively small space and functioning over long periods of time with freedom from all difficulties.

A further object is that of providing a potentiometer which will include relatively few parts each individually simple and rugged in construction, such parts being capable of ready manufacture by quantity production methods and being likewise capable of ready assemblage.

With these and other objects in mind, reference is had to the attached sheet of drawings illustrating one practical embodiment of the invention and in which:

Figure 1 is a sectional side view of the unit;
Figure 2 is a sectional plan view thereof;
Figures 3 and 4 are transverse sectional views taken respectively along the lines 3—3 and 4—4 in the direction of the arrows as indicated in Figure 1;
Figure 5 is a perspective view of a contact carrier; and
Figure 6 is a similar view of a contact such as is preferably included in the present unit.

Referring primarily to Figures 1 and 2, the numeral 10 indicates the casing of the assembly which at one end may be flanged inwardly as at 11 while its opposite end 12 is curved in a similar direction so that both ends of the casing are open. The curved end 12 provides on its inner face a bearing surface for the head 13 of a cap. The latter terminates in a plug embracing a flange 14 and preferably provides on its outer face an actuating portion which may be in the form of a transverse groove 15. This may receive the end of a screw driver or other suitable element by means of which the cap may be turned with respect to the casing. In many respects it is preferred to employ a casing such as 10. This, however, may be modified in design or completely eliminated.

The cap is preferably formed of non-conducting material. It has a friction or other suitable type of non-rotating connection with the end of a metallic sleeve 16. To assure against relative rotation of the parts a force fit may be resorted to. Otherwise any alternative form of coupling to assure this result may be used. In any event it will be apparent that if head 13 of the cap is turned the sleeve will likewise rotate. That sleeve provides on its inner face a helical thread. As is preferable, if the sleeve be formed of metal stock this thread will be defined by corrugations 17 extending throughout its length.

The length of sleeve 16 is such that it terminates short of the flanged end portion 11 of casing 10. A housing in the form of a tube is disposed internally of sleeve 16. This housing is formed of insulating material and includes in section two generally semi-circular parts. At one end these parts furnish a boss 18 extending into the socket defined by flange 14 of the cap. At their opposite ends the sections terminate in semi-circular head portions 19 which as in Figure 3 have projecting portions 20 extending through openings in casing 10. As also shown especially in this figure, the mating surfaces of the different head sections are contoured to interlock; this having been indicated at 21. Through their central portions 22 the units providing the tube have their edges spaced from each other. Within the boss or extending inner end portion of the tube the sections again extend in face-to-face contact. Interlocking contours may, of course, be provided at both ends. In any event, it is apparent that the tube due to projecting portions 20 or otherwise is prevented from turning with respect to casing 10.

Within the bore of this tube the electrical elements furnishing the potentiometer proper are disposed. These elements might take one of several different forms. A preferred arrangement of the parts has been illustrated and includes a generally U-shaped grouping. One arm 23 of this assembly may provide the variable resistance path for current. If a wire winding is not employed, then this arm of insulating material will be furnished with a suitable resistance coating 24 on its inner face. The second arm is maintained in spaced relationship with respect to the first arm and connected thereto at its inner end by a bridging portion 25. That bridging portion essentially embraces an extension of an outer metallic strip 26 forming a part of the second arm assembly. This strip defines the outer face of that assembly and has bearing against its inner face an insulating strip 27. In turn bearing against the inner face of the latter is a metallic strip 28. Thus, the insulating strip 27 electrically isolates strips 26 and 28. The width of all of these strips and including strip 23 is preferably equal to the height of the bore defined by the tube sections as shown particularly in Figures 3 and 4. Terminals 29, 30, 31 are provided which extend through the opening defined by flange 11. These terminals or leads are respectively coupled to the resistance associated with strip 23, the end of strip 28 and the end of strip 26.

Now with a view to providing a movable contact as part of the assembly a carrier unit is employed. This has been shown to best advantage in Figure 5. It may include a rectangular frame or body 32 of metal the aperture of which is of sufficient area to accommodate a contact member. That member as shown in Figure 6 may include a U-shaped strip 33 of spring stock having its opposite outer faces punched outwardly as at 34 to provide engaging or contact elements. The lower edge of frame member or carrier 32 is conveniently formed with a protuberance 35. Its upper edge may define a pair of these protuberances 36. The spacing of the latter is equal to the spacing of adjacent convolutions of thread as formed in sleeve 16. The face surface of these protuberances is likewise equal to the contouring of the sleeve threads.

In operation it will be understood that the parts have been assembled as shown. Leads will have been connected to each of the terminals 29, 30 and 31 or else these terminals will have been extended into a suitable socket assembly to connect them with proper leads. The carrier 32 has been disposed between the adjacent spaced edges of the central portions 22 of the insulating tube. Its height is such that the protuberances 35 and 36 bear in the trough portions of the threads embraced within sleeve 17. This is clearly brought out in Figure 4 in which there has also been shown the disposition of contact 33 within frame member 32. So disposed and with the parts properly proportioned, contact element 34 will bear respectively against the conductive layer 24 and the inner face of strip 28.

If the casing 10 is prevented from rotating then—as afore brought out—the sections of the tube within sleeve 16 are likewise prevented from rotating. Accordingly it follows that the U-shaped conductive assembly of the potentiometer is likewise held against rotation. Now, by associating a suitable implement with the groove of the cap and as the cap is turned with respect to the casing, sleeve 16 will likewise rotate. The threads on the inner face of the latter being engaged by the carrier 32 and the latter being incapable of rotation, that carrier will shift axially of the unit. As it so shifts its contacts in engagement with the conductive resistance path and strip 28 will vary the current values embraced in a circuit including terminals 29, 30 and 31. Thus an extremely simple and effective system of potentiometer is provided in which no center impelling member or screw is necessary.

Accordingly it is apparent that among others the several objects of the invention each specifically as noted are achieved. Obviously numerous changes in construction and rearrangements of the parts might be resorted to without departing from the spirit of the invention as defined by the claims.

I claim:

1. A potentiometer including in combination a tube providing a slot extending across its body, an electrically conductive strip carried by said tube, a slidable contact-carrying element extending into said slot to engage said strip and be slidably supported by and non-rotatably mounted with respect to said tube, an outer sleeve rotatable with respect to said tube and means for connecting said element with said sleeve to shift the former axially as the latter rotates with respect to said tube.

2. A potentiometer including in combination a tube providing a slot extending across its body, and electrically conductive strip carried by said tube, a slidable contact-carrying element extending into said slot to engage said strip and be slidably supported by and non-rotatably mounted with respect to said tube, an outer sleeve rotatable with respect to said tube, said sleeve being formed with screw-thread on its inner face, said element being connected with said thread and said sleeve being rotatable with respect to said tube to shift said element axially of the latter.

3. A potentiometer including in combination a tube providing a slot extending across its body, an electrically conductive strip carried by said tube, a slidable contact-carrying element extending into said slot to engage said strip and be slidably supported by and non-rotably mounted with respect to said tube, an outer sleeve rotatable with respect to said tube, said sleeve being formed with a screw-thread in its inner face, a projecting portion of said element engaging said thread and said sleeve being rotatable with respect to said tube to cause said element to shift axially of the latter.

4. A potentiometer including in combination a tube providing a slot extending across its body, an electrically conductive strip carried by said tube, a slidable contact-carrying element extending into said slot to engage said strip and be slidably supported by and non-rotatably mounted with respect to said tube, an outer sleeve rotatable with respect to said tube, means for connecting said element with said sleeve to shift the former axially as the latter rotates with respect to said tube and said tube comprising a pair of substantially semi-circular sections connected to each other.

5. A potentiometer including in combination a tube providing a slot extending axially of its body, an electrically conductive strip carried by said tube, a slidable contact-carrying element extending into said slot to engage said strip, an outer sleeve rotatable with respect to said tube, means for connecting said element with said sleeve to shift the former axially as the latter rotates with respect to said tube, said tube comprising a pair of portions which, in cross-section, are substantially semi-circular and the edges of different portions being spaced from each other to provide said slot.

6. A potentiometer including in combination a tube providing a slot extending axially of its body, an electrically conductive strip carried by said tube, a slidable contact-carrying element extending into said slot to engage said strip, an outer sleeve rotatable with respect to said tube, means for connecting said element with said sleeve to shift the former axially as the latter rotates with respect to said tube, said tube comprising a pair of portions which, in cross-section, are substantially semi-circular, the edges of different portions being spaced from each other to provide said slot and end parts included in such portions and having their edges in face-to-face contact.

7. A potentiometer including in combination a tube providing a slot extending axially of its body, an electrically conductive strip carried by said tube, a slidable contact-carrying element extending into said slot to engage said strip, an outer sleeve rotatable with respect to said tube, means for connecting said element with said sleeve to shift the former axially as the latter rotates with respect to said tube, said tube comprising a pair of portions, which, in cross-section, are substantially semi-circular, the edges of different portions being spaced from each other to provide said slot, end parts included in each of such portions and said end parts presenting engaging and interlocking edges to prevent shifting of the tube portions with respect to each other.

8. A potentiometer including in combination a tube providing a slot extending axially of its body, an electrically conductive strip carried by said tube, a slidable contact-carrying element extending into said slot to engage said strip, an outer sleeve rotatable with respect to said tube, means for connecting said element with said sleeve to shift the former axially as the latter rotates with respect to said tube, said strip being included in an assembly, said assembly being U-shaped, the adjacent arms of said assembly being formed of conductive material and a second strip forming a part of one arm and insulated from the adjacent strip of said arm.

9. A potentiometer including in combination a tube providing a slot extending axially of its body, an electrically conductive strip carried by said tube, a slidable contact-carrying element extending into said slot to engage said strip, an outer sleeve rotatable with respect to said tube, means for connecting said element with said sleeve to shift the former axially as the latter rotates with respect to said tube, said element comprising a frame member and a U-shaped contact disposed within the aperture of said member.

10. A potentiometer including in combination a slotted member, a resistance element, a contact element, one of said elements being fixed against movement with respect to said member, the other of said elements slidably contacting said one element and being axially shiftable with respect to said member, a second member enclosing said slotted member, a helical groove formed on the inner face of said second member and said shiftable element extending through the slot in said first-named member into engagement with said groove whereby as said members are rotated with respect to each other said last-named element will be shifted.

11. In a potentiometer as specified in claim 10, means for preventing relative axial movements of said members whereby they will be restricted solely to rotation with respect to each other.

12. In a potentiometer as specified in claim 10, said resistance element constituting the one fixed against movement with respect to said slotted member and said contact element constituting the one axially shiftable with respect to such member.

References Cited in the file of this patent

UNITED STATES PATENTS 2,481,682    Payne                Sept. 13, 1949